United States Patent [19]

Takumi et al.

[11] 4,108,971

[45] Aug. 22, 1978

[54] METHOD OF MANUFACTURE OF SPHERICAL ALUMINA PARTICLES

[75] Inventors: Shizuo Takumi, Kamakura; Toshio Hashimoto; Masaru Tatsushima, both of Isehara, all of Japan

[73] Assignee: Nikki-Universal Co., Ltd., Tokyo, Japan

[21] Appl. No.: 836,065

[22] Filed: Sep. 23, 1977

[30] Foreign Application Priority Data

Feb. 25, 1977 [JP] Japan .................................. 52-20117

[51] Int. Cl.$^2$ ................................................ C01F 7/02
[52] U.S. Cl. ..................................... 423/428; 423/625; 423/630; 423/631; 252/463
[58] Field of Search ................ 423/628, 625, 630, 631

[56] References Cited

U.S. PATENT DOCUMENTS

| | | | |
|---|---|---|---|
| 2,620,314 | 12/1952 | Hockstra | 423/628 |
| 3,105,053 | 9/1963 | Cramer et al. | 423/628 |
| 3,346,336 | 10/1967 | Hayes | 423/628 |
| 3,367,741 | 2/1968 | Notari et al. | 423/628 |
| 3,943,070 | 3/1976 | Milthe | 423/628 |

*Primary Examiner*—Herbert T. Carter
*Attorney, Agent, or Firm*—Blanchard, Flynn, Thiel, Boutell & Tanis

[57] ABSTRACT

Substantially spherical alumina particles are obtained by a process comprising ageing substantially spherical alumina hydrogel particles obtained by the oil-drop method in an ammonium hydroxide solution wherein the concentration of ammonia changes continuously from an initial concentration in the range of from about 0.05 wt.% to about 0.5 wt.% to a final concentration in the range of from about 0.8 wt.% to about 2.5 wt.%. Alumina particles obtained by this process possess improved physical strength. Alumina particles which are obtained by calcining alumina particles aged in an ammonium hydroxide solution, wherein the concentration of ammonia increases continuously, at a temperature in the range of from 650° to 800° C in an atmosphere containing 30 mol.% or more of $H_2O$ possesses a further improved thermal stability.

5 Claims, No Drawings

METHOD OF MANUFACTURE OF SPHERICAL ALUMINA PARTICLES

BACKGROUND OF THE INVENTION

The present invention relates to an improved method of manufacturing spherical alumina particles. More particularly, it relates to a method of manufacturing spherical alumina particles which are in physical strength by an improvement of the stage for ageing spherical alumina hydrogel obtained by the oil-drop method. It also relates to a method of manufacturing spherical alumina particles which are superior in physical stability, particularly thermal stability by an improvement of the ageing stage followed by a calcination stage of spherical alumina hydrogel.

In the case of employing spherical alumina particles as a catalyst or as a catalyst carrier, the performance of said particles is judged not only by their reactivity or activity, selectivity and stability, but also by their physical stability.

When spherical alumina particles are employed as a carrier of the catalyst for purifying exhaust gases, the thermal stability of the spherical alumina particles at an elevated temperature constitutes a particularly indispensable requirement. Spherical alumina particles, when used at an elevated temperature, occasionally develop some volume shrinkage the alumina particles due to structural change thereof, and this shrinkage tends to cause voids to appear in the tightly packed catalyst bed, thereby causing the reactant to channel through the catalyst bed without effectively contacting the catalyst. Besides, in the case of a catalyst packed in a reactor or convertor which is subject to rather frequent vibration, the interparticle contact becomes excessive, resulting in a loss of catalyst due to abrasion. While, in the case where the spherical alumina particles are exposed to an elevated temperature, due to thermal sintering of the alumina particles, a part of the pores thereof becomes blocked and the structural change of the pores brings on a considerable reduction of the surface area. This causes extinction of a portion of the active sites of the catalyst, which causes a lowering of the efficiency of the catalyst. The present invention is intended to provide a method of manufacturing spherical alumina particles suitable for use even under such severe conditions.

Spherical alumina particles are advantageously manufactured by the well-known oil-drop method substantially as described in U.S. Pat. No. 2,620,314. Briefly, the method comprises commingling an acidic alumina hydrosol with a weak base which hydrolyzes to ammonia with increasing temperature and effects a strong buffering action, dispersing the resulting mixture as droplets in an appropriate water-immiscible liquid thereby forming substantially spherical alumina hydrogel particles, ageing the thus obtained particles, washing in water, drying and calcining thereafter.

In the prior art, spherical hydrogel particles are usually aged in a hot oil bath in the first place and they are next aged in an alkaline medium such as ammonium hydroxide solution. The concentration of ammonia in said ammonium hydroxide solution is maintained at a fixed concentration in the range of from about 1 wt.% to about 3 wt.%. However, according to this conventional ageing in an ammonium hydroxide solution, the surfaces of the particles are apt to be cracked and this tendency is conspicuous particularly in the case of particles having a diameter of more than about 2 mm. Not only that, the conventional ageing process has a drawback that, in proportion to the lessening of the apparent bulk density of spherical alumina particles, the surface area thereof decreases. Such undesirable phenomena seem to be attributable to the fact that alumina particles before their pore structure is established, come in contact with an ammonium hydroxide solution having a relatively high concentration.

Referring to the calcining stage for alumina particles after ageing, it is common in the prior art to calcine dried spherical alumina particles at a temperature in the range of from about 425° to about 760° C in an oxidizing atmosphere. However, spherical alumina particles thus calcined are not always satisfactory in thermal stability at elevated temperature and the volume shrinkage thereof and the decrease of surface area are relatively great. To be suitable for use as a catalyst or a catalyst carrier at an elevated temperature, spherical alumina particles are required to have a lesser degree of volume shrinkage and decrease of surface area. These drawbacks are considered ascribable to a change in the pore structure and/or the crystal structure of the spherical alumina particles due to thermal sintering. At present, however, in order to enhance the resistance of spherical alumina particles to elevated temperature, a complicated step such as addition of alkaline earth metal and so on thereto must be resorted to. In a method as above-mentioned, however, it is an inevitable disadvantage that the commercial value of the spherical alumina particles as a catalytic carrier is greatly decreased depending on its use.

SUMMARY OF THE INVENTION

A principal object of the present invention is to manufacture spherical alumina particles which possess superior physical strength by subjecting spherical alumina hydrogel obtained by the well-known oil-drop method to ageing in an ammonium hydroxide solution having an adjusted concentration.

Another object of the present invention is to manufacture spherical alumina particles which are superior in thermal stability by calcining the thus aged gel particles in the presence of an adjusted amount of water.

Accordingly, the present invention provides a method of manufacturing substantially spherical alumina particles comprising commingling alumina hydrosol with a thermally hydrolyzable weak base, dispersing the resulting mixture in the form of droplets in an oil suspending medium at an elevated temperature thereby to gel and form substantially spherical alumina hydrogel particles, and then ageing, washing with water, drying, and calcining said alumina hydrogel particles, which method is characterized in that said alumina hydrogel particles are first aged in an oil suspending medium having a temperature in the range of from about 50° to about 105° C, they are next aged in an ammonium hydroxide solution having a concentration of ammonia in the range of from about 0.05 wt.% to about 0.5 wt.% for at least 1 to 2 hours, and they are then aged in an ammonium hydroxide solution in which the concentration of ammonia is increased continuously up to a final concentration in the range of about 0.8 wt.% up to about 2.5 wt.% for a period of from about 6 to about 15 hours.

Further, the present invention provides a method of manufacturing spherical alumina particles, which is further characterized in that the spherical alumina particles aged by the foregoing procedures are washed with water, dried, and thereafter calcined at a temperature in the range of from about 650° to about 800° C in an atmosphere containing 30 mol.% or more of $H_2O$.

DESCRIPTION OF THE PREFERRED EMBODIMENTS

The method of the present invention is substantially as described in U.S. Pat. No. 2,620,314, except for the stage of ageing in an ammonium hydroxide solution and the stage of calcination. The desirable acidic alumina hydrosol for use in manufacturing spherical alumina particles is aluminum chloride hydrosol, and this hydrosol is prepared typically by digesting excess metallic aluminum with aqueous hydrochloric acid until a desired aluminum content is attained.

Next, this alumina sol containing aluminum and chloride anion is commingled with a weak base which is hydrolyzable at elevated temperature and manifests a strong buffering action. As the weak base for this purpose, such a substance as hexamethylenetetramine, urea, or mixture thereof is useful. In the case where hexamethylenetetramine is applied, a solution thereof having a concentration in the range of from about 15 wt.% to about 40 wt.% is employed. And, as to the amount of said solution to be employed, it suffices to be an amount sufficient for neutralizing the chloride anion contained in the alumina sol as a result of hydrolysis. When the alumina sol contains 26 wt.% $Al_2O_3$ and the hexamethylenetetramine solution to be commingled with said sol has a concentration of 30 wt.%, the appropriate mixing ratio of alumina sol to said solution by volume is in the range of from about 3:1 to about 1:1.

The mixture of alumina hydrosol and hexamethylenetetramine is dispersed as droplets in a suspending medium immiscible with water such as, for instance paraffin oil etc., heated up to a temperature sufficient to give rise to hydrolysis and conducive to effecting gelation of the hydrosol within a desired period of time. This temperature of the suspending medium must be a temperature sufficient for maintaining the water content of the spherical alumina particles in substantially the liquid plase. Otherwise, the hydrogel spheres would get cracked or have the physical strength thereof lessened as a result of evaporation of the water contained therein. Generally, said temperture is held in the range of from about 50° to about 105° C, preferably in the range of from 88° to 95° C. While passing through this suspending medium, a part of the hexamethylenetetramine is hydrolyzed, and during this period, said sol forms spherical hydrogel particles. This hydrogel is aged at an elevated temperature within the oil employed as the suspending medium. The temperature for this ageing is practically the same as the temperature for forming the gel, that is, it is ordinarily in the range of from about 50° to about 105° C, preferably in the range of from about 88° to about 100° C, and the time for said ageing is at least 10 hours, preferably it is in the range of from 14 hours to 24 hours or more. In the course of this ageing process, hexamethylenetetramine remaining in the spherical hydrogel particles hydrolyzes, thereby further polymerizing alumina.

According to the prior art, spherical hydogel particles once aged within a suspending medium are subjected to ageing at an elevated temperature in an ammonium hydroxide solution having a fixed concentration in the range of from about 1 wt.% to about 3 wt.% for about 8 hours. Unlike the prior art, in the case of the method according to the present invention, spherical hydrogel particles once aged within a suspending medium are first aged in an ammonium hydroxide solution having a low concentration of ammonia and thereafter they are aged in an ammonium hydroxide solution having a continuously increasing concentration of ammonia at a temperature in the range of from about 50° to about 100° C for at least 8 hours. The initial ammonia concentration of the ammonium hydroxide solution for use in the present invention is in the range of from about 0.05 wt.% to about 0.5 wt.%, and the spherical hydrogel particles are aged in this dilute ammonium hydroxide solution for at least 1 hour, preferably 2 hours or thereabouts, at a temperature in the range of from about 50° to 100° C. Thereafter, the particles are further aged in an ammonium hydroxide solution, whose ammonia concentration increases continuously from the foregoing initial concentration up to a final concentration in the range of from about 0.8 wt.% to about 2.5 wt.%, at a temperature in the range of from about 50° to about 100° C for at least 6 hours, preferably about 8 hours or more. According to the present invention, it is particularly desirable to set the initial ammonia concentration of the ammonia hydroxide solution at about 0.1 wt.% and the final ammonia concentration thereof at about 1.5 wt.%.

Upon finishing the ageing, the spherical hydrogel particles are washed in water so as to remove water-soluble salts such as ammonium salt therefrom, and are thereafter dried at a temperature in the range of from about 95° to about 315° C for a period of from about 2 hours to about 12 hours. This drying is preferably performed gradually in moist air as it is conducive to lessening the breakage of the spherical alumina particles.

Spherical particles after drying may be calcined in an oxidizing atmosphere having a temperature of from about 425° to about 760° C as in the prior art. However, when this calcining is performed at a temperature in the range of from about 650° to 800° C for a period of from about 2 hours to about 10 hours in an atmosphere containing 30 mol.% or more of $H_2O$, the thermal stability of the spherical alumina particles can be enhanced and the volume contraction of the spherical particles at elevated temperature can be lessened.

Hereunder will be further elucidated the method of the present invention with reference to examples embodying the invention, but it goes without saying that the scope of the present invention is not limited thereby.

EXAMPLE I

An alumina sol was prepared by employing metallic aluminum and hydrochloric acid. This alumina sol contained 13.5 wt.% of aluminum, and the ratio of aluminum to chlorine by weight was 1.25 : 1. The amount of aqueous hexamethylenetetramine solution employed was 400 ml of 27 wt.% hexamethylenetetramine solution relative to 395 ml of said alumina sol. After commingling thoroughly, the mixture (aluminum content: 7.5 wt.%) was dispersed as droplets in a vertical column of oil (paraffin oil) maintained at about 92° C. The spherical hydrogel particles recovered from the bottom of the column were transferred to a separate vessel and were aged for 15 hours in oil maintained at a temperature in the range of from 95° to 100° C.

Next, a 0.2 wt.% ammonium hydroxide solution maintained at 92° C was flowed into the bottom of the same vessel, whereby said spherical hydrogel particles were aged within an ammonium hydroxide solution having an ammonia concentration of 0.2wt.% for 2 hours, and then the ammonia concentration was continuously increased gradually during the period of from the 2nd hour to the 9th hour until a final ammonia concentration of 1.2 wt.% was attained in the 9th hour. The hydrogel particles thus aged were washed in running water having a temperature of 90° C for 7 hours. The thus washed hydrogel particles were first dried thoroughly at 120° C, and then the dried particles were calcined in air at 350° C for a first 1-hour period, at 510° C for a 2nd 1-hour period, and at 630° C for a final 2-hour period.

EXAMPLE II

Except for the conditions for ageing by means of ammonium hydroxide solution, the same operation as described in Example I was performed. The ageing with ammonium hydroxide solution was performed by a procedure in which the hydrogel particles were aged in a 0.1 wt.% ammonium hydroxide solution maintained at 92° C for a first 2-hour period and then they were aged for a period of from the 2nd hour to the 10th hour in said ammonium hydroxide solution while increasing the initial ammonia concentration thereof gradually until it finally attained 1.5 wt.% in the 10th hour.

COMPARATIVE EXAMPLE I

Except for the conditions for ageing by means of the ammonium hydroxide solution, the same operation as in Example I was performed. The ageing with ammonium hydroxide solution was performed in a 2 wt.% ammonium hydroxide solution maintained at 92° C.

Along with measurements of the apparent bulk density and the surface area of the spherical alumina particles obtained in Examples I and II and Comparative Example I, observation of the surfaces as well as the interiors of said alumina particles was conducted after lending transparency to the sample particles by soaking them in alphachloronaphthalene. The results were as shown Table-I below.

Table-I

| | Example I | Example II | Comparative Example I |
|---|---|---|---|
| apparent bulk density (g/cc) | 0.35 | 0.35 | 0.35 |
| surface area (m²/g) | 205 | 207 | 160 |
| product which developed cracks (number of particles per 100 particles of product) | 1 | 0 | 15 |
| average crushing strength (Kg) | 9.5 | 9.0 | 6.0 |

As is clear from the showing in Table-I, according to the method of the present invention, the the surface area of spherical alumina particles is enhanced, the number of particles having cracks is much decreased, and the average crushing strength of particles is increased. This verifies that the method of the present invention increases the number of active sites and also enhances the average physical strength, so that the industrial value thereof is tremendous.

EXAMPLE III

Spherical alumina particles were manufactured by the same procedures as described in Example I except that the hydrogel particles washed in water were thoroughly dried beforehand, and then calcined at 550° C for 1 hour and at 700° C for 2 hours subsequent thereto in a humid air-stream made to contain 45 mol.% moisture by feeding steam therein.

EXAMPLE IV

Spherical alumina particles were manufactured through the same procedures as described in Example I except that the hydrogel particles washed in water and dried were calcined at 550° C for 1 hour and at 700° C for 2 hours subsequent thereto in a humid air-stream containing 70 mol.% of moisture.

COMPARATIVE EXAMPLE II

Spherical alumina particles were manufactured through the same procedures as described in Example I except that the hydrogel particles washed in water and dried were calcined at 550° C for 1 hour and at 700° C for 2 hours subsequent thereto in a humid air stream containing 15 mol.% of moisture.

COMPARATIVE EXAMPLE III

In this Comparative Example III, spherical alumina particles were prepared through the same operation as described in Example I except that the spherical hydrogel particles washed in water and dried were thoroughly dried in air at 550° C for 1 hour and at 700° C for 2 hours successively.

Measurement was conducted on the spherical alumina particles obtained in Examples III and IV and Comparative Examples II and III with respect to the apparent bulk density, the surface area reduction rate in the case where spherical alumina particles were subjected to 24 hours' heat treatment at 980° C (as expressed by $$\frac{\text{surface area before heat treatment} - \text{surface area after heat treatment}}{\text{surface area before heat treatment}} \times 100),$$

the pore volume as well as the pore diameter as measured by the mercury penetration method, and the volume shrinkage in the case where the spherical alumina particles were subjected to 24 hours' heat treatment at 980° C. The results were as shown in Table-II below.

Table-II

| | Example III | Example IV | Comparative Example II | Comparative Example III |
|---|---|---|---|---|
| apparent bulk density (g/cc) | 0.35 | 0.35 | 0.35 | 0.35 |
| surface area reduction rate (%) | 26 | 25 | 41 | 44 |
| pore volume (cc/g) | 1.40 | 1.41 | 1.39 | 1.25 |
| pore diameter (A) | 295 | 300 | 260 | 230 |
| volume shrinkage (%) | 3.5 | 3.5 | 6.3 | 6.8 |

As is evident from the showing in Table-II, the surface area reduction rate of the spherical alumina particles formed by the method of the present invention, to wit, in Examples III and IV, is low, and besides, the volume shrinkage apparently decreases. This verifies the thermal stability of the spherical alumina particles manufactured by the present method, and therefore the effect of the present method is remarkable.

As will be understood from the foregoing descriptions, according to the method of the present invention which is characterized by effecting the ageing of spherical hydrogel particles obtained by the oil-drop method in an ammonium hydroxide solution having continuously increasing ammonia concentration, it is possible to manufacture spherical alumina particles having a superb, uniform physical strength. Besides, spherical alumina particles obtained by the present method can be of a large surface area even though the apparent bulk density thereof is low. Furthermore, when said alumina particles are calcined in an atmosphere wherein an adjusted amount of $H_2O$ is present, the thermal stability of said alumina particles can be enhanced. Accordingly, spherical alumina particles manufactured by the present method can be very profitably utilized as an adsorbent and/or a refining agent for use in the chemical industry, petroleum industry, etc., or as a conversion catalyst for organic compounds, especially hydrocarbons, or a catalyst carrier.

What is claimed is:

1. In a method of manufacturing substantially spherical alumina particles comprising commingling alumina hydrosol with a weak base which has a strong buffering action and is thermally decomposable at elevated temperature, dispersing the resulting mixture as droplets in a suspending medium to effect gelation thereby forming substantially spherical alumina hydrogel particles, thereafter ageing said hydrogel particles in said suspending medium, then ageing said hydrogel particles in aqueous ammonium hydroxide solution, then washing said particles in water, then drying and calcining same to obtain spherical alumina particles, the improvement which comprises:

the step of ageing said hydrogel particles in aqueous ammonium hydroxide solution is performed by contacting said particles with an aqueous ammonium hydroxide solution having an ammonia concentration in the range of from about 0.05 wt.% to about 0.5 wt.% for a first time period of at least one hour and then subjecting the thus aged particles to further ageing by contacting said particles with aqueous ammonium hydroxide solution for a second time period of at least about six hours and during said second time period continuously increasing the concentration of ammonia in said solution from an initial ammonia concentration in the range of from about 0.05 wt.% to about 0.5 wt.% up to a final ammonia concentration in the range of from about 0.8 wt.% to about 2.5 wt.%.

2. The method of claim 1, in which said alumina hydrosol contains chloride ions, said weak base is hexamethylenetetramine, urea or mixture thereof, and the amount of said weak base is an amount sufficient for thoroughly neutralizing the chloride ions contained in said alumina hydrosol.

3. The method of claim 1, further characterized in that the step of ageing said hydrogel particles in aqueous ammonium hydroxide solution is performed by first ageing said hydrogel particles at a temperature in the range of from about 50° to about 100° C for about 2 hours in an aqueous ammonium hydroxide solution having an ammonia concentration of about 0.1 wt.% and thereafter ageing said particles at a temperature in the range of from about 50° to about 100° C for a period of at least about 8 hours in an aqueous ammonium hydroxide solution whose ammonia concentration is continuously increased from about 0.1 wt.% to about 1.5 wt.%.

4. The method of claim 1, further characterized in that the aged alumina particles are washed in water and dried, and thereafter said particles are calcined at a temperature in the range of from about 650° to about 800° C for a period of from about 2 hours to about 10 hours in an atmosphere containing at least 30 mol. % of water in vapor form.

5. The method of claim 1 in which said first time period is from about one to about two hours, said second time period is from six to 15 hours and the temperature during said first and second time periods is from about 50° to about 100° C.

* * * * *